United States Patent

Hagen

[11] Patent Number: 6,131,741
[45] Date of Patent: Oct. 17, 2000

[54] METHOD AND DEVICE FOR THE TREATMENT OF WASTE OR RESIDUAL WASTE

[75] Inventor: Bianca-Maria Hagen, Solms-Obendorf, Germany

[73] Assignee: Herhof Umwelttechnik GmbH, Solms-Niederbiel, Germany

[21] Appl. No.: 08/996,508

[22] Filed: Dec. 23, 1997

[30] Foreign Application Priority Data

Dec. 23, 1996 [DE] Germany ............................ 196 54 255

[51] Int. Cl.$^7$ ...................................................... B03B 1/00
[52] U.S. Cl. ................................ 209/3; 209/19; 209/20; 209/44; 241/24.12; 241/79
[58] Field of Search .................... 209/3, 19, 20, 209/44, 467, 466, 472, 471, 479, 481; 241/24.1, 24.12, 68, 79

[56] References Cited

U.S. PATENT DOCUMENTS

| | | | |
|---|---|---|---|
| 3,365,281 | 1/1968 | Musschoot et al. | 209/472 X |
| 4,033,458 | 7/1977 | Chazen et al. | 209/472 X |
| 5,024,334 | 6/1991 | Misra et al. | 209/472 X |
| 5,462,172 | 10/1995 | Kumagai et al. | 209/479 X |

Primary Examiner—David H. Bollinger
Attorney, Agent, or Firm—Dilworth & Barrese

[57] ABSTRACT

To improve a method for the treatment of waste or residual waste (1), the waste or residual waste (1) is sorted into a fraction (16) with specifically light material and a fraction (18) with specifically heavy material first by sieving and then followed by sorting by density, preferably by a dry-cleaning table (8).

24 Claims, 2 Drawing Sheets

METHOD AND DEVICE FOR THE TREATMENT OF WASTE OR RESIDUAL WASTE

BACKGROUND OF THE INVENTION

The invention relates to a method for the treatment of waste or residual waste and to a device to perform said method.

When looking at the distribution of density of normal mixtures of waste or residual waste, it becomes clear that the fractions stone/ceramics with a density of 2 to 3 g/cm$^3$, glass with a density of around 2.6 g/cm$^3$ and metal with a density of about 2 to 3 g/cm$^3$ possess a much greater density than other fractions such as plastic with a density of around 0.9 to 1.4 g/cm$^3$. Here residual waste is understood as a mixture created from the biological or mechanical or mechano-biological treatment of waste or a waste mixture. Such biological or mechano-biological treatment can be performed in a closed container with induced ventilation.

It is the object of the invention to propose an improved method for the treatment of waste or residual waste.

SUMMARY OF THE INVENTION

This object is solved in accordance with the invention by the waste or residual waste being sorted into one fraction with specifically low density material and another fraction with specifically heavy material, i.e. a sorting by density is performed. As it is particularly the fractions of stone/ceramics, glass and metal which make up the predominant portion of impure and inert materials and as these fractions are in a relatively tight density range (from around 2 to 3 g/cm$^3$), it is proposed in accordance with the invention to effect the separation of impure and inert materials by sorting by density.

Advantageous further embodiments are described herein.

Preferably, the sorting or sorting by density is performed by a dry-cleaning table. The dry-cleaning table comprises a sloped deck with intergrated air nozzles. The deck is set into elliptically oscillating motion while air flows in from below through the air nozzles. The material to be sorted is loaded into the center of the deck. The specifically light material is raised slightly by the air flowing through and flows down and off in line with the slope of the deck. The specifically heavy material cannot be raised by the airflow. It is taken up by the oscillating movement of the deck and thus transported to the upper edge where it is thrown off, i.e. the deck is set in oscillating motion in such a way that the specifically heavy material is transported upwards.

A further advantageous embodiment is characterized in that the waste or residual waste is pre-categorised prior to sorting or sorting by density. This pre-categorized is preferably performed by sieving. The waste or residual waste is separated into two or more fractions. One fraction, preferably, the sieved material, is fed to sorting or sorting by density or to the dry-cleaning table.

It is advantageous to separate mineral parts rolling downwards out of one fraction of the pre-categorization or sieving, preferably the sieve overflow. This is preferably done by an inclined belt separator.

A further advantageous embodiment is characterized in that prior to the sorting or sorting by density or prior to the pre-categorization the waste is treated biologically or mechanically or mechano-biologically, preferably stabilized, preferably in a closed container with induced ventilation.

It is advantageous if the fraction with specifically heavy material is crushed. Preferably, a selective crushing is performed. The crushing or selective crushing can be performed using a baffle and/or impact and/or roll crushing, device and/or an impact crusher and/or a roller crusher. The fraction with specifically heavy material comprises essentially stone, ceramics and glass. If metal was not previously separated, this will also be present. In addition, specifically heavy material, which is also known simply as heavy material, can also contain low portions of wood and hard plastic. The low portions of wood and hard plastic lead to the heavy material not being able to meet the requirements of the German Technical Regulation on the Utilisation, Treatment and Other Disposal of Communal Waste (TASi) with regard to ignition loss. This problem is solved by the selective crushing of the heavy material. In classical treatment a distinction is made between crushing by pressure, impact or shearing. Each treatment form is predestined for the crushing of a different material. It is characteristic for the crushing performed here with an impact crusher or a roller crusher, i.e. by impact or pressure, that materials which have a brittle break capacity can be crushed easily. Materials which have a fiber structure, which are ductile or elastic, can be crushed only with difficulty if at all. This effect is made use of in selective crushing. The brittle components of the heavy material, i.e. stone, glass and ceramics, are crushed to the desired screen size. Intrusive materials such as wood (fibrous) or plastic (elastic) are not crushed. After crushing, stone, glass and ceramics can then be separated from the organic intrusive materials by means of sieve categorization.

Accordingly, a further advantageous embodiment is charaterized in that the crushed or selectively crushed fraction is separated, preferably sieved, into two fractions. The super-sieve fraction (i.e. the sieve overflow) contains the elastic pairs (wood and plastic). This can be taken for incineration. The sub-sieve contains the mineral parts.

The sub-sieve fraction is preferably washed. Here, the organic surface contamination still present on the crushed heavy material due to adhesion is rinsed off in a wash. Organic materials which may still adhere as sorbates to the mineral pairs of the sub-sieve fraction are rinsed off via a washing unit.

The washed material is preferably dried. It can be added to the incineration fraction after drying.

A device for the treatment of waste or residual waste is charaterized in accordance with the invention by a dry-cleaning table for the sorting of the waste or residual waste.

Preferred embodiments of the device are described herein.

Preferably, a sieve is used to pre-categorize the waste or residual waste.

Another advantageous embodiment is charaterized by an inclined belt separator to separate mineral parts rolling downwards out of the sieve overflow.

It is advantageous to provide a closed container with induced ventilation for the mechanical and/or biological stabilization of the waste.

Another advantageous embodiment is charaterized by a baffle and/or impact and/or roller crushing device and/or an impact crusher and/or a roller crusher for the crushing, preferably the selective crushing, of the fraction with specifically heavy material.

It is advantageous to provide a sieve for the separation of the crushed or selectively crushed fraction into two fractions.

Another advantageous embodiment is charaterized by a washing unit to wash the sub-sieve.

Preferably a dryer is on hand to dry the washed material.

BRIEF DESCRIPTION OF THE DRAWINGS

One embodiment of the invention is described below in detail by means of the enclosed drawings, in which.

DESCRIPTION OF THE PREFERRED EMBODIMENTS

Figure 1:
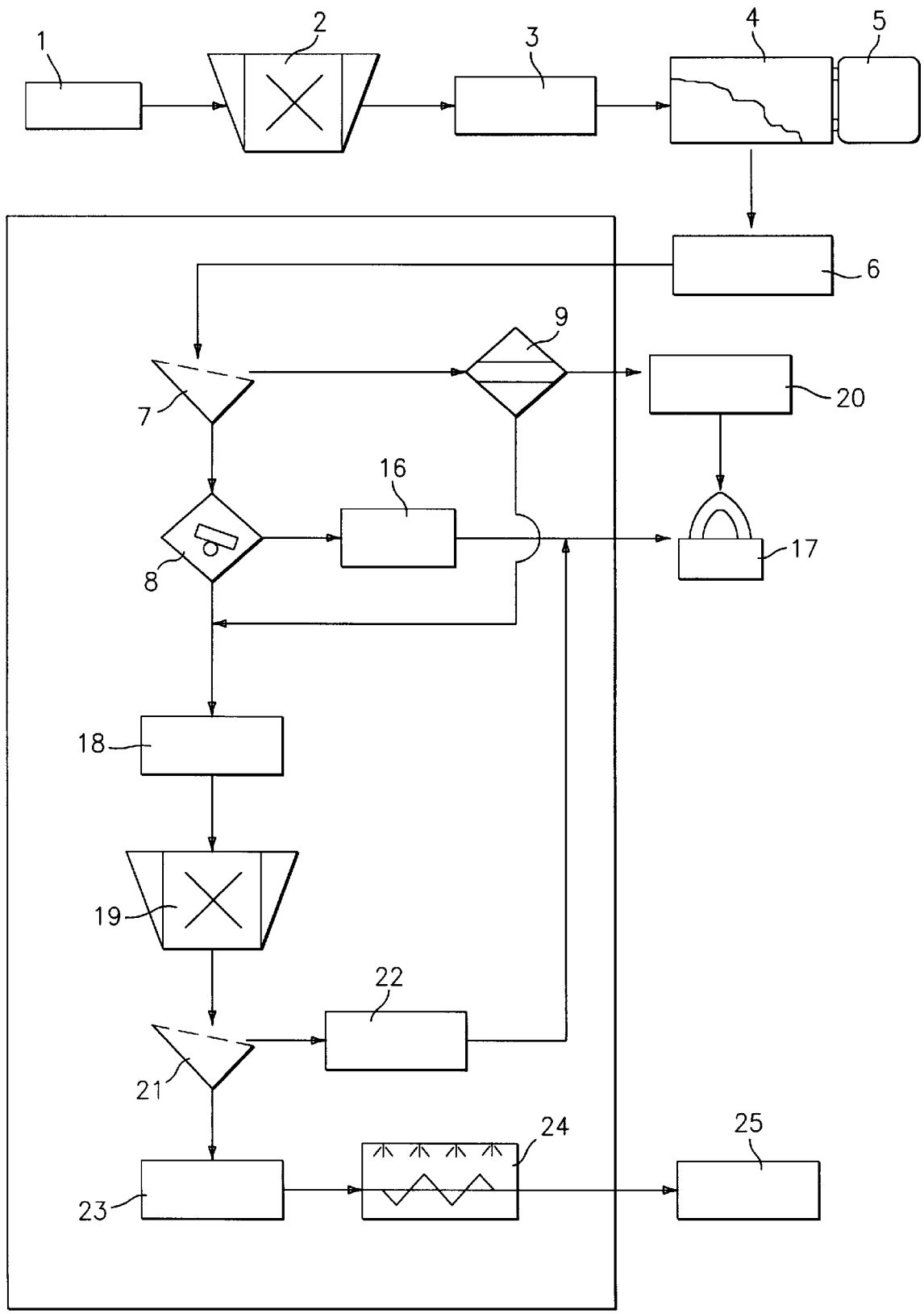
FIG. 1 shows a method flowchart, and FIG. 2 a dry-cleaning table in a schematic representation.

The residual waste 1 is crushed in a shredder 2 to a screen size of less than 150 mm. This residual waste 3 is then fed to a closed container 4. The closed container 4 can be closed by a door 5. In the closed container 4, the residual waste is biologically stabilized under induced ventilation.

The dry stabilized product 6 created in this way is led to a sieve 7. The sub-sieve goes to the dry-cleaning table 8, the sieve overflow to the inclined belt separator 9.

Figure 2:
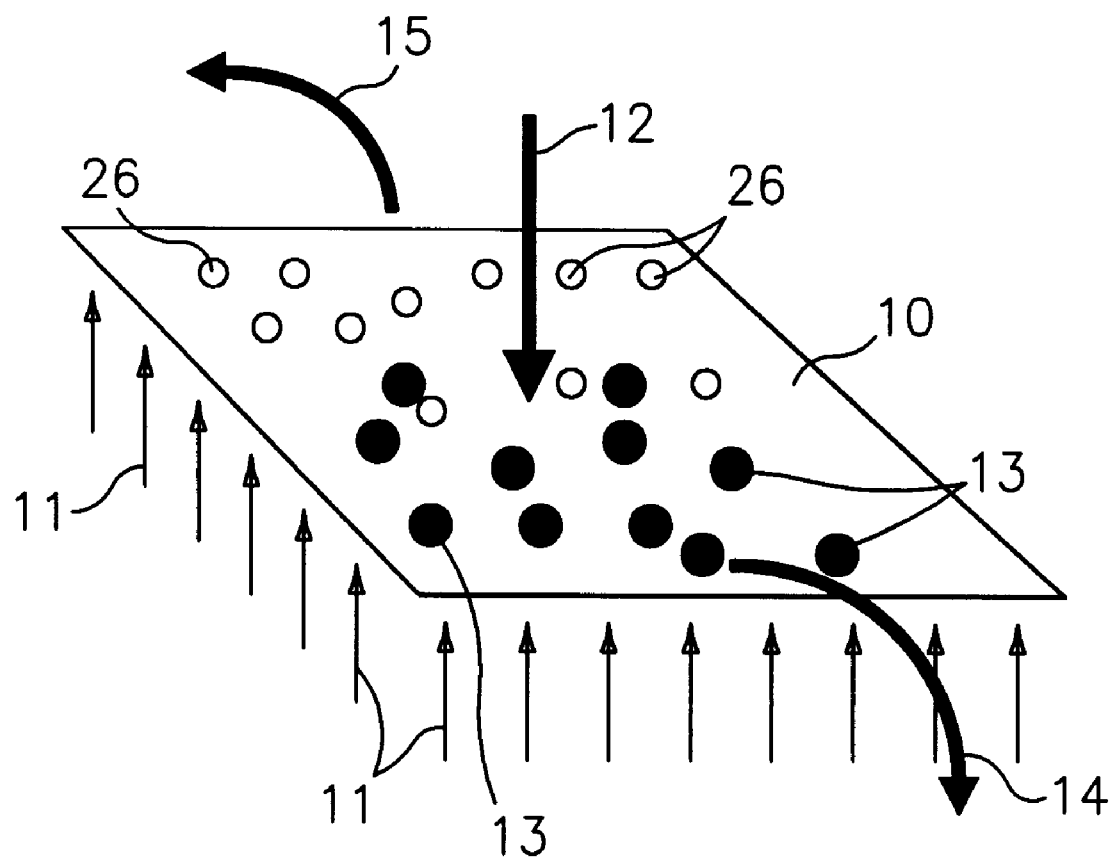

The dry-cleaning table 8 is shown in schematic form in FIG. 2. It comprises a sloped deck 10 with integrated air nozzles through which air flows in the direction of the arrows 11. The deck 10 is set into elliptically oscillating motion during this. The material is loaded into the center of the deck as indicated by the arrow 12. The specifically light material (light material) 13 is raised slightly by the flowing, air 11 and flows down and off in the direction of the allow 14 according to the slope of the deck. The specifically heavy material (heave material) 26 cannot be raised by the airflow 11. It is taken up by the oscillating movement of the deck 10 and thus transported to the upper edge and thrown off there in the direction of the arrow 15.

The flowing air is freed of any airborne material particles behind the dry-cleaning table, i.e. after flowing through the dey-cleaning table, by a cyclone separator not shown in the drawing.

Thanks to the pre-categorization performed prior to the dry-cleaning table 8 by the sieve 7, it is achieved that the screen spectrum has a maximum of 3:1. Conventional dry-cleaning tables can in fact process a maximum screen spectrum of 3:1.

After the dry-cleaning table 8, a material freed from the mineral fraction exists as light material which possesses substantially improved incineration properties over the starting material. The light material is fed as the combustible fraction 16 to incineration 17.

A material exists as heavy material which essentially comprises stone, ceramics and glass, possibly also metal, and in which low portions of wood and hard plastic are also present. This (contaminated) heavy material 18 is led to selective crushing 19.

As can be seen from FIG. 1, the sieve overflow from the sieve 7 is led to the incineration fraction 20 via the inclined belt separator 9 for the purpose of separating mineral parts rolling downwards. The incineration fraction 20 is then forwarded to incineration 17. The other fraction of the inclined belt separator 9 is led to the heavy material 18 coming out of the dry-cleaning table 8.

The material crushed by means of the selectively working crushing device 19 is separated into two fractions in a sieve 21. The super-screen fraction 22 essentially comprises wood and plastic. It is led to incineration 17 as the incineration fraction. The sub-sieve 23, which contains all mineral parts—(contaminated) stone and glass—with organic materials still adhering as sorbates, is led to a washing unit 24 which comprises a helical conveyor with water nozzles and in which organic materials adhering as sorbates are washed off. The organic materials washed off are led to the incineration fraction after drying. The remaining mineral parts 25 comprise (clean) stone and glass.

By means of the method and the device in accordance with the invention, mineral residual waste components with a degree of purity for mineral material of more than 97% can be separated. Initially, a dry stabilized product is made from residual waste by means of mechano-biological stabilization. This is separated into at least two fractions by a sieve with one fraction being led over a dry-cleaning table and one fraction being led to the incineration fraction over an inclined belt separator for the purpose of separating mineral parts rolling downwards. The fraction led over the dry-cleaning table is separated into two fractions with one fraction being led to the incineration fraction and the second fraction being led as contaminated heavy material to a selectively working crushing. This fraction is separated after selective crushing into two fractions by means of a sieve with the super-screen fraction containing all elastic parts and the sub-sieve all the mineral parts with organic material adhering as sorbates which are then rinsed off in a washing unit and led to the incineration fraction after drying. The invention provides a method and a device for the separation of inert material from mechano-biologically treated residual waste after selective crushing. In the helical conveyor with water nozzles, the organic surface contamination still on the crushed heavy material due to adhesion is washed off in a wash.

What is claimed is:

1. A method for the treatment of waste or residual waste (1), wherein the waste or residual waste (1) is sorted (8) into a fraction (16) with specifically light material and a fraction (18) with specifically heavy material, the sorting is performed by a dry-cleaning table (8), and the waste or residual waste (1) is pre-categorized prior to the sorting (8).

2. A method in accordance with claim 1, wherein parts of the heavy material fraction (18) rolling downwardly are separated from the light material fraction (16).

3. A method in accordance with claim 2, wherein the parts of the heavy material fraction (18) rolling downwardly are separated by an inclined belt separator (9).

4. A method in accordance with claim 1, wherein prior to sorting pre-categorization (7), the waste is treated biologically or mechanically or mechano-biologically.

5. A method in accordance with claim 4, wherein the waste is stabilized in a closed container (4) under induced ventilation prior to precategorization (7).

6. A method in accordance with claim 1, wherein the waste or residual waste (1) is sieved for pre-categorizing.

7. A method in accordance with claim 1, wherein the dry-cleaning table (8) comprises a sloped deck (10) with integrated air nozzles and being set into elliptically oscillating motion while air flows in from below the table (11) through the air nozzles, such that the specifically light material (13) is raised slightly by the air flowing through (11) and flows downwardly and off in line with the slope (14) of the deck (10), and the specifically heavy material (26) is taken up by the oscillating movement of the deck (10) and transported to an upper edge of the sloped deck (10) where the specifically heavy material (26) is thrown off in an upward direction (15) due to the oscillating manner of the sloped deck (10).

8. A method in accordance with claim 1, wherein the sorting is by density (8).

9. A method for the treatment of waste or residual waste (1), wherein the waste or residual waste (1) is sorted (8) into a fraction (16) with specifically light material and a fraction (18) with specifically heavy material, and the fraction (18) with specifically heavy material is crushed.

10. A method in accordance with claim 9, wherein the crushed fraction is further separated into two fractions (22, 23) by sieving, a super-screen fraction (22) and a sub-sieve fraction (23).

11. A method in accordance with claim 10, wherein the sub-sieve fraction (23) is further washed (24).

12. A method in accordance with claim 11, wherein the washed material fraction (23) is further dried.

13. A method in accordance with claim 9, wherein the fraction (18) with specifically heavy material is selectively crushed (19) by means of at least one of a baffle crushing device, an impact crusher or a roller crusher.

14. A device for the treatment of waste or residual waste (1), comprising a sieve (7) for the pre-categorization of the waste or residual waste, followed by a dry-cleaning table (8) for the sorting of the waste or residual waste (1).

15. A device in accordance with claim 14 comprising an inclined belt separator (9) positioned for the further separation of an overflow from the sieve.

16. A device in accordance with claim 14, wherein the dry-cleaning table (8) comprises a sloped deck (10) with integrated air nozzles and being set into elliptically oscillating motion while air flows in from below the table (11) through the air nozzles, such that the specifically light material (13) is raised slightly by the air flowing through (11) and flows downwardly and off in line with the slope (14) of the deck (10), and the specifically heavy material (26) is taken up by the oscillating movement of the deck (10) and transported to an upper edge of the sloped deck (10) where the specifically heavy material (26) is thrown off in an upward direction (15) due to the oscillating manner of the sloped deck (10).

17. A device in accordance with claim 14, additionally comprising a closed container (4) positioned with induced ventilation for the mechanical and/or biological stabilization of the waste prior to pre-categorization in the sieve (7).

18. A device for the treatment of waste or residual waste (1), comprising a closed container (4) with induced ventilation for the mechanical and/or biological stabilization of the waste, and followed by a dry-cleaning table (8) for the sorting of the waste or residual waste (1).

19. A device in accordance with claim 18, wherein the dry-cleaning table (8) comprises a sloped deck (10) with integrated air nozzles and being set into elliptically oscillating motion while air flows in from below the table (11) through the air nozzles, such that the specifically light material (13) is raised slightly by the air flowing through (11) and flows downwardly and off in line with the slope (14) of the deck (10), and the specifically heavy material (26) is taken up by the oscillating movement of the deck (10) and transported to an upper edge of the sloped deck (10) where the specifically heavy material (26) is thrown off in an upward direction (15) due to the oscillating manner of the sloped deck (10).

20. A device for the treatment of waste or residual waste (1) comprising a dry-cleaning table (8) for the sorting of the waste or residual waste (1) into a fraction (16) with specifically light material and a fraction (18) with specifically heavy material, and at least one of a baffle crushing device, an impact crusher or a roller crusher for the crushing of the fraction (18) with specifically heavy material.

21. A device in accordance with claim 20, comprising a sieve (21) arranged for the separation of the crushed fraction into two fractions (22, 23), a super-screen fraction (22) and a sub-sieve fraction (23).

22. A device in accordance with claim 21, comprising a washing unit (24) positioned for the washing of the sub-sieve fraction (23).

23. A device in accordance with claim 22, comprising a dryer positioned after the washing unit (24) to dry the washed material.

24. A device in accordance with claim 20, wherein the dry-cleaning table (8) comprises a sloped deck (10) with integrated air nozzles and being set into elliptically oscillating motion while air flows in from below the table (11) through the air nozzles, such that the specifically light material (13) is raised slightly by the air flowing through (11) and flows downwardly and off in line with the slope (14) of the deck (10), and the specifically heavy material (26) is taken up by the oscillating movement of the deck (10) and transported to an upper edge of the sloped deck (10) where the specifically heavy material (26) is thrown off in an upward direction (15) due to the oscillating manner of the sloped deck (10).

* * * * *